Sept. 16, 1969   L. C. FOSTER ET AL   3,467,509
METHOD OF MAKING GLASS TO METAL SEALS
Filed April 6, 1967

Inventors
Leigh Curtis Foster
John P. Lindley
By [signature]
   Attorney 3,467,509
METHOD OF MAKING GLASS TO METAL SEALS
Leigh Curtis Foster, Atherton, and John P. Lindley, Redwood City, Calif., assignors to Zenith Radio Corporation, Chicago, Ill., a corporation of Delaware
Filed Apr. 6, 1967, Ser. No. 628,994
Int. Cl. C03c 27/04; C03b 23/20
U.S. Cl. 65—33                                              7 Claims

ABSTRACT OF THE DISCLOSURE

A composite article has two elements exhibiting diverse thermal expansion coefficients, as exemplified by a metal pin protruding through a ceramic wall. The pin is sealed in the wall by a vitreous glass of a material which devitrifies when subjected to a selected temperature within a certain range. The glass exihibts a thermal expansion coefficient, prior to being subjected to a temperature in that range, that is less than either of the thermal expansion coefficients of the elements. In forming the seal, the two elements and the glass are heated to a temperature substantially above the aforesaid certain range but for a period of time only sufficient to melt the glass and after the heat treatment, the glass actually exhibits an effective thermal expansion coefficient intermediate those of the elements which it has sealed together.

INTRODUCTION

Figure 1:
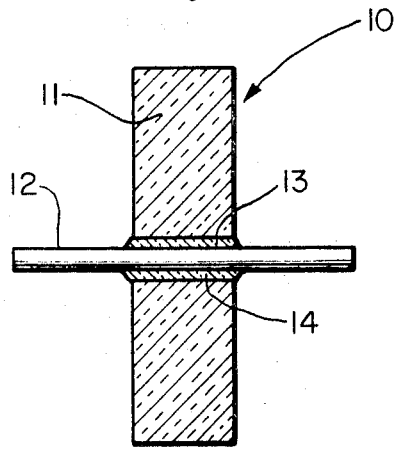

The present invention pertains to a composite article and methods of making seals. More particularly, the invention relates to the bond between two elements having diverse thermal expansion coefficients for sealing together such objects as glass, ceramic or metal parts.

Where two objects to be joined have different thermal expansion coefficients, a conventional approach is to use a solder glass frit having a thermal expansion coefficient intermediate those of the two objects. The frit is brought to its melting temperature at which it wets the surfaces of the two objects. Upon subsequent cooling, the seal which is formed is under compression, a feature found generally to yield stronger and more vacuum-tight seals. The frit utilized to form these conventional seals usually forms a vitreous glass upon cooling.

Vitreous glasses typicallly are made by mixing inorganic materials and melting them together at a high temperature; numerous different combinations of materials are known for this purpose. The resulting hot liquid, when cooled, becomes rigid without crystallizing. The latter condition characterizes that formation which is called "vitreous."

In recent years, however, considerable attention has been devoted to the formation of so-called glass ceramics, glasses which are made to crystallize by the inclusion of not only the usual ingredients but also of small quantities of nucleating agents. The glass compound containing the nucleating agent is first heated to a high temperature at which the agent is dissolved into the molten glass. The mass is then carefully cooled to a point at which the nucleating agent precipitates as finely dispersed particles. Upon subsequent elevation of the temperature once again, crystals grow on the nucleating-agent particles to produce the glass ceramic. Finally, the material is cooled to room temperature.

Glass ceramics are noted for the fact that, as they cool, their viscosity increases substantially. One such glass ceramic is made from silica, alumina and magnesia with small amounts of titania as the nucleating agent. These materials are melted together and then crystallized in the manner described above to produce cordierite, crystopalite and rutile. A number of glass ceramics created by nucleation are discussed more fully in an article entitled "Controlled Nucleation and Crystallization Lead to Versatile New Glass Ceramics," by Dr. S. Donald Stookey, which appeared in Chemical and Engineering News, vol. 39, pp. 116–125, June 19, 1961.

In an attempt to make better seals between parts of glass, metal or ceramic, U.S. Letters Patent 2,889,952, issued June 9, 1959, seeks to use a vitrified sealing glass which, during the sealing operation, is caused to become devitrified. The patent suggests that the powder glass frit used as a sealing material first be fused by heating the frit to its melting temperature. The frit is then maintained at the temperature at which devitrification occurs for a sufficient time to accomplish the devitrifying action. Upon subsequent cooling, the resultant seal apparently is a glass ceramic produced as the result of nucleation.

It is a general object of the present invention to provide and achieve a new and improved seal between two elements having diverse thermal expansion coefficients.

Another object of the present invention is to provide and achieve such a seal which takes advantage of the properties of a material capable of being devitrified.

A further object of the present invention is to provide and achieve a seal between two elements of diverse thermal expansion characteristics which seal is capable of being produced in quantity with the occurrence of a minimum of defects.

In one aspect, the invention relates to a process for bonding two such elements having diverse thermal expansion coefficients. The elements are joined with a vitreous glass which devitrifies when subjected to a temperature within a predetermined range. The elements in the glass are then heated to a temperature substantially above that predetermined range for a period of time sufficient to melt the glass with the latter wetting the elements. Finally, the elements in the glass are cooled to ambient temperature.

Figure 2:
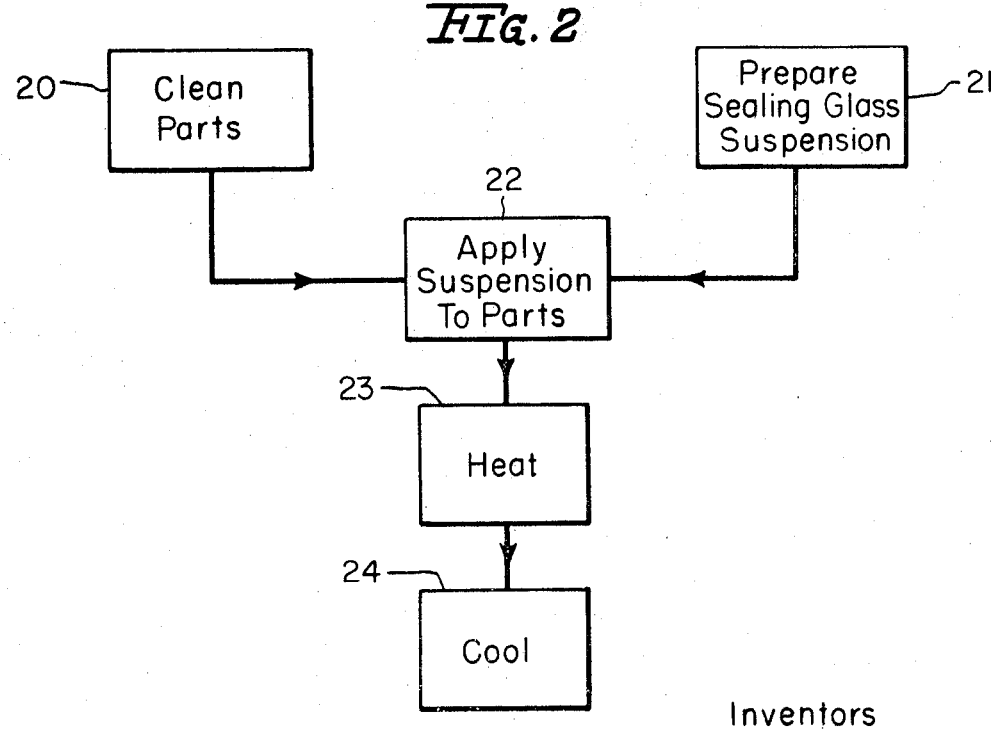

The features of the present invention which are believed to be novel are set forth with particularity in the appended claims. The invention, together with further objects and advantages thereof, may best be understood, however, by reference to the following description taken in conjunction with the accompanying drawing in the two figures of which like reference numerals indicate like elements and in which:

FIGURE 1 is a cross-sectional side-elevational view of a composite article including a seal formed in accordance with the present invention; and FIGURE 2 is a flow chart of a process carried out in accordance with the present invention.

FIGURE 1 depicts a composite article 10 having elements 11 and 12 which individually exhibit diverse thermal expansion coefficients. In this instance, element 11 is a disc of a ceramic material, such as $Al_2O_3$, in which a tubular aperture 13 is formed. Element 12 projects through aperture 13 and in this instance is a molybdenum pin. The thermal expansion coefficient of pin 12, then, is approximately $5.2 \times 10^{-6}$ inches per inch per degree centigrade and the thermal expansion coefficient of disc 11 is about $9.2 \times 10^{-6}$ inches per inch per degree centigrade. Such a structure is typically found in high-vacuum microwave tubes wherein disc 11 constitutes an end wall of the tube envelope and pin 12 serves as an electrode. Usually, there are a number of such pins functioning to permit electrical connections to different electrodes within the tube envelope.

Sealingly joining disc 11 and pin 12 rigidly and in a vacuum-type manner is a mass of vitreous glass 14. Glass 14 is composed of a material which devitrifies when subjected to a selected temperature within a certain predetermined range. Moreover, prior to being subjected to such a temperature, the glass may exhibit a thermal expansion coefficient of a value less than that of the coefficients of either disc 11 or pin 12. Nevertheless, as formed in the structure of FIGURE 1, glass 14 exhibits an effective thermal expansion coefficient which is intermediate the thermal expansion coefficients of disc 11 and pin 12.

As revealed in the aforesaid article and the patent, there is a wide variety of vitreous glasses subject to being devitrified by the action of nucleating agents. These likewise exhibit thermal expansion coefficients varying over a wide range of values. Similarly, there also are hundreds of different glasses, metals and ceramics each of which has its own thermal expansion coefficient. Consequently, for any particular two elements to be joined, it is necessary to select an appropriate one of the devitrifiable sealing glasses. That is, it is first known which two elements are to be joined so that their thermal expansion coefficients are readily determined. Consequently, a devitrifiable sealing glass preferably is selected from those which initially exhibit a thermal expansion coefficient less than those of either of the two elements to be joined.

While as indicated there are a wide variety of possible combinations selectable from known materials, one appropriate sealing glass for the particular materials here illustrated for disc 11 and pin 12 in the article of FIGURE 1 is that known to the trade as Pyrocerma type 45 manufactured by Corning Glass Works of Corning, N.Y. under code number 7574. This material exhibits an initial expansion coefficient of about $4.2 \times 10^{-6}$ inches per inch per degree centigrade, less than those of disc 11 or pin 12. Analysis reveals that the sealing glass is a composition (by weight) of:

| | Percent |
|---|---|
| $ZnO$ | 62.2 |
| $SiO_2$ | 10.1 |
| $B_2O_3$ | 27.4 |
| $Al_2O_3$ | 0.1 |
| $MgO$ | 0.05 |
| Lead | Trace |
| Moisture and incidental | 0.15 |

Of key significance herein, while glass 14 is a material capable of being devitrified as described, it in fact is not. To this end, disc 11 and pin 12 are sealed by heating these elements and a frit of the glass to a temperature substantially above the range of temperatures at which glass 14 would devitrify. The elements and the glass are held at that temperature only for a period of time sufficient to permit the glass to melt and wet the exposed surfaces of disc 11 and pin 12. Upon then subsequently cooling the elements and the glass to ambient temperature, glass 14 is vitrified. The resulting seal is both rugged and adequate to retain a high vacuum.

FIGURE 2 depicts a processing schedule for use in forming the seal in the device of FIGURE 1. As a first step 20, the surfaces of both disc 11 and pin 12 are thoroughly cleaned by scrubbing them gently with lint-free paper tissue or with a cloth soaked with a suitable solvent such as acetone or isopropanol. It is desirable that all inorganic and organic materials, such as grease and oil, be eliminated from the surfaces. At the same time, in step 21 a suspension of the sealing glass powder is prepared. Such a suspension is formed by utilizing a stainless-steel stirrer or the like to thoroughly mix the glass powder or frit in a volatile solvent such as mitrocellulose amyl-acetate. It is preferred that the preparation of the suspension occur only shortly before the sealing operation and that, prior to that, the glass frit be stored in a tightly closed container in order to prevent contamination.

In step 22, the suspension is applied to the surfaces of one or both of the parts to be joined. In the case of article of FIGURE 1, the suspension may be applied with a glass pipette or from a polyethylene squeeze bottle to the surface of pin 12 after which the latter is inserted within the opening. In any given application, the configuration of the parts and the amount of area to be covered determines the consistency of the suspension desired by the user. A typical ratio by weight of glass to the binder vehicle is 12 to 1.

After application of the suspension to the parts to be joined, it is preferred that the assembly be dried in order to permit the amyl-acetate to evaporate out of the suspension. This may be achieved simply by several hours of air drying in a well-ventilated area or by drying in an oven at perhaps 100 degrees centigrade for thirty minutes or so.

In some instances, it may be desired to preglaze one or both of the parts to be joined. To accomplish such preglazing, the glass frit is heated just enough to become glassy and form a continuous surface. However, it is not heated sufficiently to devitrify. For example, the Pyroceram 45 mentioned previously may be preglazed by heating it for approximately ten minutes at 660 degrees centigrade. Such preglazing is not essential, although in many cases it may be convenient as sort of a preforming step permitting the elements to be more readily assembled with other components before conducting the final sealing operation.

The process as thus far described may be exactly the same as that now known to the trade for producing a devitrified seal. In that prior process, the actual sealing operation involves elevating the temperature in order to melt the solder glass, bringing about wetting of the surfaces by the glass and mutual interaction to form a bond. After melting the glass, the temperature is then held at the devitrifying temperature for a period of time sufficient to permit substantial devitrification to take place. For example, with Pyroceram 45, the temperature typically is maintained at 750 degrees centigrade for a period of one hour in order to achieve the devitrification. Both the heating and cooling rates are usually about 3 to 5 degrees centigrade per minute although the heating rate sometimes is as high as 15 degrees centigrade per minute. In this prior process, care is always taken to insure that subsequent thermal processing, such as exhaust bakeout cycles in the production of vacuum tubes, do not result in subjecting the seals to temperatures in excess of the devitrification value.

In contrast with the aforementioned step of selectively heating the elements to be joined so as to achieve devitrification, in step 23 of the present embodiment the elements and the glass frit are brought, preferably with comparative rapidity, to a temperature above the devitrification range for the frit material. That high temperature need be retained only for the period of time necessary for the glass frit to melt and wet the surfaces of the elements to be joined. Subsequently in step 24, the entire assembly is allowed to cool, and this again may be at a comparatively rapid rate.

For example, the previously mentioned Pyroceram 45, which customarily is devitrified at about 750 degrees centigrade and which has a devitrification range of about 750 degrees to 775 degrees centigrade, preferably is heated in the present process to about 990 degrees centigrade for a period of 3 to 5 minutes. However, satisfactory seals have been obtained with the same frit material by utilizing heating temperatures anywhere in the range between 800 and 1125 degrees centigrade. Also, satisfactory seals have been obtained with rates of both heating and cooling of anywhere in the range between 40 and 80 degrees centigrade per minute. Of course, in step 24 the entire assembly ultimately is cooled to ambient or room temperature.

In a particular application in which sixteen molybdenum pins of 0.030 inch diameter each were sealed into a ceramic tube wall opening of 0.035 inch diameter, a number of devices were constructed utilizing the manufacturer's recommended heating schedule for Pyroceram 45 in order to obtain a devitrified seal. Only a fifty percent successful yield was obtained, well below that necessary for commercial utilization. When instead practicing the presently disclosed process with the same elements and utilizing the same preparation but instead employing a sealing temperature of 990 degrees centigrade, well above the devitrification range, a one-hundred percent yield was obtained with a significant number of the same devices.

In the prior process, where devitrification is deliberately obtained, it is necessary for the attainment of suitable results to maintain carefully the elements to be joined and the glass frit at the same temperature to insure that the heating or baking temperature of the components themselves is such as properly to produce the devitrification. In the new process here described, this degree of criticality is not required. This makes it much easier to maintain sufficient control during actual production of large quantities of the article being fabricated.

In a modification of the foregoing technique, yet additional strength of the resulting seal or joint is obtained by adding a quantity of crystalline particles to the glass frit prior to formation of the seal. The particles have a thermal expansion coefficient compatible with that of the frit and a melting temperature above that reached in the sealing operation. For the materials exemplified above, a suitable such additive was ground quartz. While this improvement exists for a number of different percentages of quartz in the frit, a maximum improvement is achieved when the initial dry mixture is by weight twenty percent quartz and eighty percent Pyroceram 75. Utilizing standard tensile test specifications, the strength of the seal resulting from the addition of the twenty percent quartz particles is approximately doubled.

As noted, in the preferred relationship of the different thermal expansion coefficients the initial coefficient of the glass frit is somewhat lower than those of the two elements to be joined. Yet, after utilizing the process here disclosed a compressional seal results, indicating that the final thermal expansion coefficient of the glass frit at least effectively lies between the values of the jointed elements. While this may be the result of an actual change in the expansion coefficient of the frit material, the same effect is achieved by choosing the dimensions of the pin and aperture so that only a thin film of the frit is used. In that case, the desired compression exits because of the relative expansion coefficients of the two elements being joined and the actual expansion coefficient of the frit may still be less than those of the elements.

Typically, the finished seal contains a plurality of bubbles inside the material. It appears that these separated bubbles contribute a desired degree of resiliency to the joint.

The process here disclosed also may be utilized to improve seals formed by the prior devitrification technique. That is, it has been found that the final seal obtained is independent of the previous history of the formed joint. Thus, a joint in which the glass has been permitted to devitrify can subsequently be subjected to the elevated heating temperature here described as a result of which the sealing material again becomes vitreous. However, as preferably formed the heating and cooling rates are sufficiently rapid through the devitrification range to preclude any significant amount of devitrification; the sealing material remains in a glassy or liquid state as the temperature is changed throughout that particular range.

An examination of seals formed in accordance with the process herein described used to join a metal to a ceramic reveals that the sealing glass causes the formation of an oxide on the surface of the metal. Moreover, the oxide coating appears only when the seal is subjected to the temperature substantially above the devitrification range of the glass. The formation of this oxide coating has been found to contribute significantly to the ultimate strength of the resulting sealed joint when the material from which pin 12 is made is molybdenum or tungsten.

The fact that the present process entails heating the elements involved to a substantially higher temperature, than heretofore utilized with certain devitrifiable materials, is additionally advantageous in connection with the formation of vacuum tubes utilizing other materials requiring higher-temperature processing. For example, in one application the vacuum tube not only had pins to be sealed in a disc as shown in FIGURE 1 but also employed copper-clad stailess-steel structures which were to be sealed to the ceramic. For this purpose, a titanium copper alloy was utilized as the sealing material for the other structures. The necessary temperature required for forming the seals utilizing the titanium copper alloy was approximately 990 degrees centigrade. Hence, both the seals and the seals for the molybdenum pins were able to be made in a single operation.

Generally, then, the comparable higher temperatures required by the present process, as compared with those where devitrification is sought, often are compatable with metal-alloy sealing temperatures so that an entire tube assembly may be formed at the same time. Still further, it then is convenient in connection with the formation of high-vacuum devices to incorporate the entire sealing processes together with the usual bake-out and exhaust processes in a single step resutling in the complete formation of the ultimate device.

We claim:

1. A process for bonding two elements having diverse thermal expansion coefficients comprising:

joining said elements with a vitreous glass which devitrifies when subjected for a given time interval to a temperature within a predetermined range;

heating said elements and said glass to a temperature substantially above said predetermined range for a period of time that is short relative to said time interval and is long enough only to melt said glass to wet the surfaces of said elements without effecting appreciable divitrification of said glass;

and cooling said elements and said glass to ambient temperature;

said glass, prior to said heating step, exhibits a thermal expansion coefficient less than either of said diverse coefficients but which, subsequent to said heating step, exhibits a thermal expansion coefficient of a value at least effectively intermediate those of said diverse coefficients.

2. A process as defined in claim 1 in which said glass prior to said heating step is a frit including a minor portion of approximately twenty percent by weight of particles of a material crystalline in structure and having a melt temperature higher than that of said glass.

3. A process as defined in claim 1 in which said heating occurs at a rate between approximately 40 and 80 de-
the group consisting of molybdenum and tungsten.

4. A process as defined in claim 3 in which said cooling occurs a a rate between approximately 40 and 80 degrees centigrade per minute.

5. A process as defined in claim 1 in which one of said elements is a ceramic and the other is selected from the group consisting of molybdenum and tungsten.

6. A process as defined in claim 1 in which said glass is of a material which, during said heating step, oxidizes the surface of one of said elements.

7. A process as defined in claim 3 in which said glass devitrifies at a temperature of approximately 750 degrees centigrade and said heating step temperature is within the range between 800 degrees centigrade and 1125 degrees centigrade.

References Cited

UNITED STATES PATENTS

| 3,088,835 | 5/1963 | Pirooz | 65—33 |
| 3,113,878 | 12/1963 | Martin | 65—59 |
| 3,367,696 | 2/1968 | Langley | 65—59 |

S. LEON BASHORE, Primary Examiner

E. R. FREEDMAN, Assistant Examiner

U.S. Cl. X.R.

65—43, 59; 106—39, 54